United States Patent [19]

Inzinna et al.

[11] Patent Number: 5,015,169

[45] Date of Patent: May 14, 1991

[54] APPARATUS FOR DIE FORMING THERMOPLASTIC SHEET MATERIAL

[75] Inventors: Louis P. Inzinna, Scotia; Herman F. Nied, Clifton Park, both of N.Y.

[73] Assignee: General Electric Company, Schenectady, N.Y.

[21] Appl. No.: 363,237

[22] Filed: Jun. 8, 1989

[51] Int. Cl.⁵ .............................................. B29C 51/22
[52] U.S. Cl. ...................... 425/394; 264/310; 264/322; 425/409; 425/DIG. 48
[58] Field of Search .............. 264/310, 322, 323, 320; 425/193, 406, 409, 418, DIG. 48, 397, 394, 150

[56] References Cited

U.S. PATENT DOCUMENTS

| | | | |
|---|---|---|---|
| 2,613,398 | 10/1952 | Crowell | 264/517 |
| 2,760,268 | 8/1956 | Richards et al. | 100/116 |
| 3,635,629 | 1/1972 | Saladin | 425/409 |
| 3,915,617 | 10/1975 | Saladin | 425/409 |
| 4,043,729 | 8/1977 | Paracchi | 425/409 |
| 4,147,486 | 4/1979 | Jahnle | 425/157 |
| 4,221,556 | 9/1980 | Kiss | 425/182 |
| 4,269,587 | 5/1981 | Tranter | 425/409 |
| 4,648,934 | 3/1987 | Kiss | 156/443 |
| 4,818,460 | 4/1989 | Nied | 264/310 |

Primary Examiner—Jay H. Woo
Assistant Examiner—James P. Mackey
Attorney, Agent, or Firm—Patrick R. Scanlon; James C. Davis, Jr.; Paul R. Webb, II

[57] ABSTRACT

An upper contoured die which mates with a lower contoured die is rotated relative to and against the lower die to progressively squeeze and deform a softened thermoplastic sheet. The two dies create sharp detail on both surfaces of the deformed sheet without tearing the sheet.

10 Claims, 2 Drawing Sheets

APPARATUS FOR DIE FORMING THERMOPLASTIC SHEET MATERIAL

RELATED PATENTS

Of interest is U.S. Pat. No. 4,818,460 issued in the name of Nied and assigned to the assignee of the present invention and incorporated by reference herein.

BACKGROUND OF THE INVENTION

1. Field of Invention

This invention relates to an apparatus for deforming thermoplastic sheet material.

2. Description of Related Art

Certain thermoplastic materials referred to as engineering thermoplastics, have relatively high strength, high impact resistance, are tough, and have high temperature and load bearing capabilities making them particularly useful in certain applications. For example, thermoplastics are achieving more widespread use in automotive applications including bumpers and other component parts requiring high strength. It would also be desirable to form large body panels of automobiles out of sheet material plastics. However, present processes for producing panels from thermoplastic materials have certain drawbacks.

Presently, notwithstanding the process of the aforementioned patent, two general types of processes are used to form thermoplastics into large parts: injection molding and sheet stamping. Each of these processes has substantial disadvantages, particularly with respect to the forming of large thin parts. As disclosed in the aforementioned patent, injection molding processes for thermoplastics are typically limited to parts less than approximately 600 square inches of surface area. This limitation is imposed by large clamping forces which must be applied to mold dies to counteract large forces generated by high injection pressures acting on large part areas.

Sheet stamping processes are also limited in their application to thermoplastics. One aspect of the problem is lack of current knowledge regarding large deformation behavior of thermoplastic materials. A further problem is that sheet stamping processes require matched dies to be compressively directed against one another to squeeze under compressive load the sheet material therebetween. The simultaneous contact of two dies for compressively squeezing the material therebetween, when deep drawing portions of the material is required, causes relatively large localized tensile loads on the material which tends to tear the thermoplastic material.

The stretching of the material results from the fact that points of the material surrounding deep drawn concave or convex areas are simultaneously clamped while the portions of the material which form the convex or concave regions are subject to relatively large elongations which thins the material. This stretching action may tear the thermoplastics materials. Additionally, the stamping process, because it requires formation of the entire sheet material simultaneously, requires relatively large stamping load forces. Such machines are costly. The present inventors recognize a need for an apparatus and a process for forming thermoplastic material which is cost effective and which is practical for forming large sheet component parts without tearing the material.

In the aforementioned U.S. Pat. No. 4,818,460, a procedure is disclosed for roll-forming thermoplastic sheet material. However, the present inventors recognize that the roller employed in the disclosed procedure, being pliable and deforming generally to the shape of the lower die against which the sheet material is formed does not provide sufficient detail to the surface of the formed sheet material engaged by the roller for certain implementations. In certain instances, it is desirable that the sheet material be deformed with sharp, clearly defined detail on both surfaces. Such sharp detail normally is produced by two dies in a stamping operation. Therefore, the present invention is directed toward providing sufficient detail to the thermoplastic material as normally produced by two mating dies as employed in the stamping process while alleviating the tearing and large machine force problems of prior art stamping machines.

SUMMARY OF THE INVENTION

An apparatus and method for compressively deforming thermoplastic material having opposing edges according to the present invention comprises rotationally displacing at least one of a pair of spaced facing mating contoured dies adapted to receive the material therebetween toward the other to progressively squeeze the material therebetween in a direction generally from one edge of the material to an opposing edge to deform the material into the contours of both dies. As a result, a fraction of the forces required in a stamping process are applied since the squeezing is performed progressively.

DETAILED DESCRIPTION OF THE DRAWINGS

Figure 1:
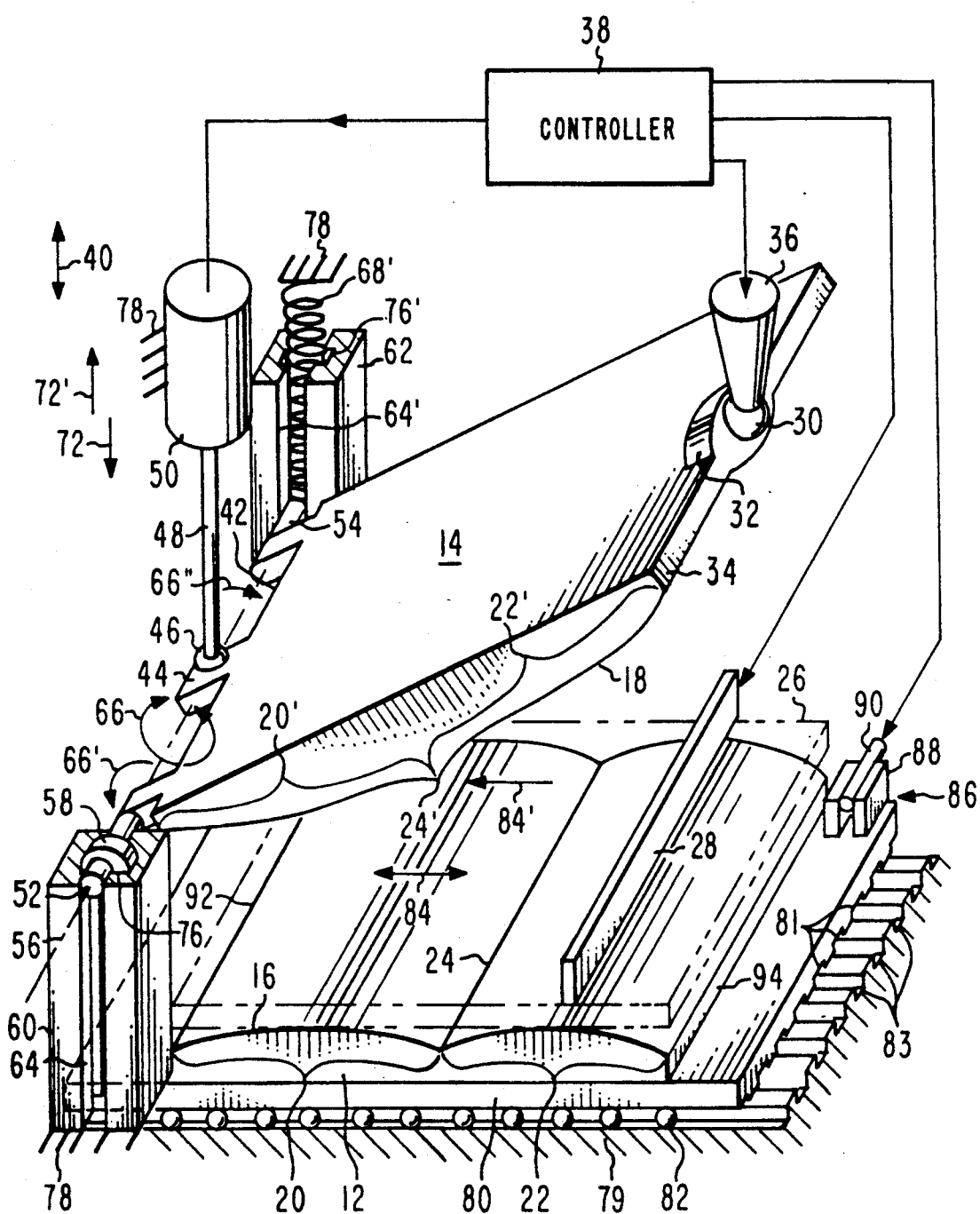
FIG. 1 is an isometric view of one embodiment of an apparatus constructed in accordance with the present invention.
Figure 2:
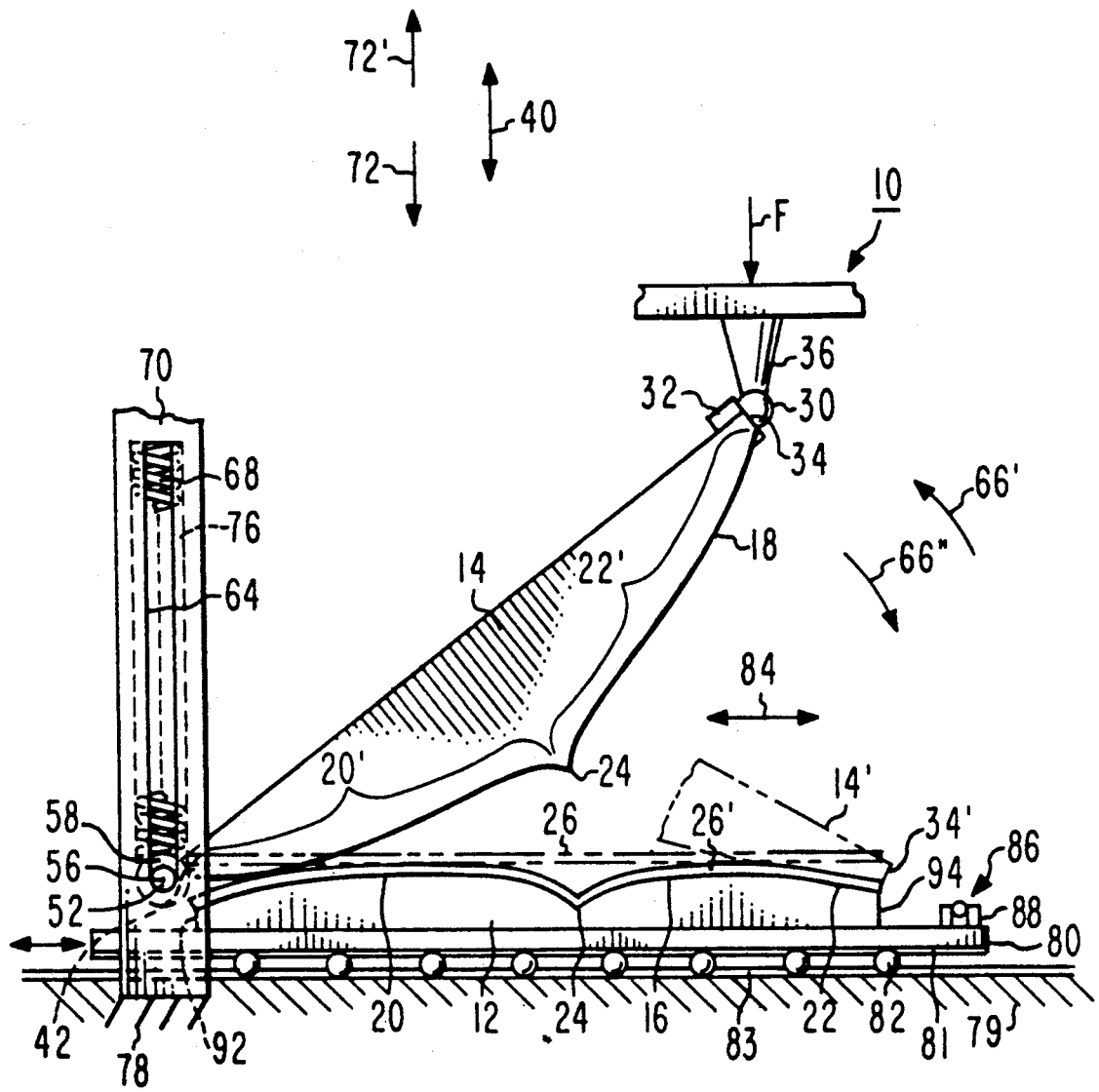
FIG. 2 is a side elevation view of the apparatus of FIG. 1.

In FIGS. 1 and 2, sheet material forming apparatus 10 includes a lower rigid metal die 12 and an upper rigid metal die 14. Die 12 has a contoured surface 16 which matches and faces the contoured surface 18 of die 14. Surface 16, for example, has a first convex portion 20 and a second convex portion 22 joined by a longitudinal V-shaped groove 24.

Surface 18 of die 14 has a convex portion 20' which mates with portion 20 of die 12 and a convex portion 22' which mates with portion 22. In addition die 14 surface 18 has a longitudinal ridge 24' which mates with groove 24. The groove 24 and ridge 24' include sufficient detail to provide a relatively sharp mating contoured surface on opposite broad surfaces of the sheet material to be formed thereby.

A planar sheet of preheated softened thermoplastic material 26, shown in phantom, overlies surface 16 of the lower die 12. Sheet material 26 is preheated to its softening temperature to permit it to be readily deformed and shaped by the compressive action of the dies 12 and 14. The sheet material 26 is initially clamped to lower die 12 by a clamp 28. The clamp 28 is shown diagrammatically for illustrating the function of the clamping action. In practice, the clamp 28 is dimensioned, shaped and positioned for clamping the softened material without damage to the sheet and for holding the sheet in place during the subsequent forming process. The surfaces 16 and 18 of the respective dies 12 and 14 are highly polished or may be coated, for example, with a sprayed on lubricant mold release agent or other suitable surface release material as used in the thermoplastic molding processes.

The upper die 14 has a ball joint 30 secured to a boss 32 at one edge 34 of the die. An actuating lever 36 is secured to the ball joint 30 under control of an actuating mechanism (not shown) for operation by controller 38. The ball joint 30 provides an articulated link between the lever 36 and the die 14. This permits relative rotation therebetween as the lever 36 is displaced in vertical directions 40 for rotating the upper die 14 toward and away from the lower die 12 about axis 56. A support 44 is secured to edge 42 of die 14 opposite edge 34. A ball joint 46 forms an articulated link between shaft 48 of actuator 50 and support 44. Actuator 50 displaces edge 42 in vertical directions 40 in response to controller 38.

A pair of spaced circular cylindrical journals 52 and 54 are secured to die 14 adjacent to edge 42 and define axis of rotation 56. Secured to the journal 52 is a circular disc-like flange 58. A similar flange (not shown) is secured to journal 54. Journal 52 and flange 58 are slidably and rotatably secured respectively within slots 64 and 76 of upright guide 60. Slots 64 and 76 extend in directions 40. Journal 54 and its corresponding flange (not shown) are respectively slidably and rotatably secured within the respective slots 64' and 76' of guide 62 corresponding to slots 64 and 76 of guide 60. The guides 60 and 62 are similar in construction, guide 60 being representative.

Referring to FIG. 2, a compression spring 68 is secured within slot 64 between journal 52 and an upper portion 70 of guide 60 for urging the journal 52 in direction 72 toward lower die 12. A similar spring 68' in FIG. 1, (not shown in FIG. 2 for clarity of illustration) is in guide 62. Representative spring 68 is of sufficient compressive loading characteristics so that the spring compressively forces die 14 against sheet material 26 in direction 72 during the forming process. Die 14 is also concurrently rotated about axis 56 in directions 66" when edge 34 of die 14 is displaced in directions 40 during the deformation portion of the forming cycle. The flange 58 and corresponding flange attached to journal 54 restrict horizontal displacement of the upper die 14 relative to the lower die 12 in transverse directions parallel to axis 56. The journals and flanges permit the upper die 14 to rotate about axis 56 or translate vertically in directions 40. The guides 60 and 62 are secured to fixed support structure represented by symbols 78.

The lower die 12 is secured to a support 80 which is slidably secured to a fixed support 79 by a ball bearing structure represented by balls 82. Balls 82 roll in grooves 81 and 83 in respective supports 80 and 79. These elements represent slidably supported guide structure for permitting the support 80 and the die 12 to move only in horizontal directions 84 normal to axis 56 and normal to directions 40, the three directions being orthogonal. The support 80 freely slides in directions 84 in response to force components in directions 84 induced by the deformation action of the compressive forces of die 14 against the material 26 lying on die 12.

Coupled to support 80 is a locking assembly 86. Assembly 86 locks the support 80 in directions 84 under control of controller 38. For example, assembly 86 may include a female receiving device 88 secured to support 80 and a male locking pin 90 driven by a solenoid (not shown) under control of controller 38. The pin 90 engages the female device 88 to secure the lower die 12 in directions 84 during the initial portion of a forming cycle. Once the initial portion of the forming cycle is completed, the pin 90 is released from the device 88 by controller 38 and the lower die 12 is then free to displace in directions 84 in response to the deformation forces induced by the rotation of upper die 14.

In operation, FIG. 1, the upper die 14 is initially raised above the lower die 12 in an idle position. The lower die 12 is aligned so that its edge 92 is aligned in directions 40 with edge 42 of the upper die 14. Clamp 28 in response to controller 38 clamps the sheet material at the start of the forming cycle. Clamp 28 clamps the sheet material 26 to the lower die 12 until the upper die 14 later engages and deforms the sheet material in the region adjacent to edges 42 and 92 of the respective dies 12 and 14. Initially, after the sheet material is clamped, the upper die is translated into a position, direction 72, for engaging the sheet material at an edge thereof. In a period subsequent to the initial engagement of the upper and lower dies with the sheet material edge, when convenient based on the parameters and dimensions involved, clamp 28 is released and removed from between the dies. In the initial portion of the deforming cycle, after the upper die is lowered into its operating position from the raised idle position, controller 38 provides a signal to actuator 50 extending shaft 48 to move die edge 42 in direction 72 toward edge 92 of the lower die to initially deform the sheet while edge 34 remains in the raised position. Die 14 is rotated about joint 30 in this portion of the deforming cycle. Later in the cycle, the actuator shaft 48 is raised in direction 72'. The compression spring 68 (FIG. 2) imposes sufficient force to keep the journals 52 and 54 in their sheet deforming engaged position with the upper die compressed against the lower die. However, the journals are permitted by the resiliency of spring 68 to move in direction 72' as lever 36 is forcibly lowered in direction 72 by an actuator (not shown) operated by controller 38.

Controller 38, FIG. 1, releases pin 90 from device 88 of the locking assembly 86 to permit the lower die 12 to freely displace in directions 84. The actuator 50 shaft 48 is released at this time so that the shaft 48 freely floats in the vertical direction. Spring 68 in cooperation with the force F (FIG. 2) exerted on the upper die by lever 36 forces the upper die toward the lower die at edge 42. In the alternative, spring 68 (and its counterpart in guide 62) may be omitted and the actuator 50 operated in synchronization with the operation of lever 36. The horizontal position of the lower die 12 in directions 84 is determined by the friction forces on the sheet material compressed between the upper and lower dies. The controller 38 causes lever 36 to displace in directions 72 toward the lower die rotating the upper die 14 about axis 56 and about an axis formed by ball joint 30.

As the upper die 14 rotates, the portion 20' of the upper die surface 18 progressively rotates over the sheet material 26 in a direction from left to right in the figures, progressively compressing the sheet against portion 20 of the lower die surface 16, bending the sheet to conform it to the contour of the upper and lower dies. The upper die 14 is continuously rotated by the force F applied to lever 36. As the upper die 14 is rotated, the contact region between the upper die and the lower die 12 progresses along a linear front following the contour of the lower die 12 toward edge 94 of the lower die. This compressive rotating action of the upper die against the lower die bends the sheet with substantially uniform stretching without tearing. While there might be some increased stretching of the sheet at sharp bends, e.g., at groove 24, it is localized sufficiently so that the material does not tear. The soft heated sheet material 26 readily bends, flows and conforms to the shape formed by the two mating surfaces of the dies as their line of contact progresses.

As the upper die is rotated, the journals 52 and 54 are forced to rise in the guides 60 and 62 in directions 72' against the force of springs 68. Thus, the journals of the upper die 14 while rotating about axis 56, also translate in directions 72' so that the upper die 14 rotates about a floating axis (not shown) in a progressive rocking motion. The lowering of edge 34 of the upper die causes the journals 52 and 54 to automatically rise in directions 72' against the force of springs 68. The location of the journals in the guides restricts the displacement of edge 42 of the upper die within a vertical plane (directions 40) defined by the respective guides 60 and 62 slots 64 and 64'. This restriction of edge 42 pulls the contact region between the two dies to the left of the drawing Figure toward the guides 60 and 62 as the upper die rotates. The pull action is transmitted to the lower die by the friction load between the dies. The friction load pulls the lower die and support 80 via the ball bearing structure balls 82 in direction 84'. Thus, the forces induced in the sheet material by the action of the upper die in direction 84' causes the lower die, which is free to displace due to the release of locking assembly 86, to displace in response to the action of the upper die. The mating contours of the upper die surface and the lower die surface and the friction load tend to keep the two dies aligned in the presence of the progressively moving compression front of the compressed material.

Lever 36 is continually forced in direction 72 squeezing and forming the sheet material until the entire lower sheet material is deformed. The edge 34 at the end of the deforming cycle is at its lowest point and the journals 52 and 54 are raised to a maximum point in this example. This is illustrated by the position of the upper die 14', a portion of which is shown in phantom, FIG. 2. After the sheet material is formed as shown in solid line at 26', the lower die is returned to its idle position of FIG. 1 by controller 38, the locking device assembly 86 is relocked and the deformed sheet material 26' removed.

In an alternative embodiment, the die 14 may be pivoted about a pivot axis centrally located between edges 34 and 42 and spaced above die 14 in direction 72'. In this case, guides 60 and 62 and journals 52 and 54 may be omitted. An actuating device (not shown) which may be similar to the actuator 50 in cooperation with the actuator operating lever 36 locates the upper die for contacting the sheet material to be formed. The actuating device and the actuator controller lever 36 are synchronized to pivot the upper die in a forming process while at the same time applying the necessary sheet forming compressive forces. The pivot action of the upper die still requires the lower die to displace horizontally in direction 84' because of the progressively moving compression front, assuming the upper die is restricted from translating in horizontal directions 84.

In the alternative, the lower die may be secured in a fixed position in directions 84, and a system comprising two spaced actuators for displacing the upper die includes mechanisms for displacing the upper die in directions 40 and 84 and for pivoting the upper die relative to the lower die. Such a structure tends to be more complex than the bearing structure comprising balls 82 and mating grooves shown in FIGS. 1 and 2. Such a system can be operated by a mechanical linkage system operated by a computer controlled system represented by controller 38.

The thermoplastic materials that may be used in the process are listed in the aforementioned U.S. Pat. No. 4,818,460. The various process parameters including the pressures, temperatures and so forth are within the skill of those who are skilled in the thermoplastic forming art and need not be described herein. Such process parameters generally are similar to those disclosed in U.S. Pat. No. 4,818,460. The upper die of an apparatus operated and constructed according to the present invention forms relatively sharp detail in the sheet material surface contacted thereby similar to the kind of detail produced in prior art stamping processes.

Of course the contour of the detail on one surface of the deformed material formed by one die in certain implementations may differ from the contour of the detail on the other opposite surface of the material deformed by the other die. For example, if a ridge or groove is desired on only one deformed surface only one die need include such detail. While therefore, the upper and lower dies generally are dimensioned and contoured to deform the material to a typically uniform thickness, this may not be so for all implementations. Thus the reference to mating and matched dies herein and in the claims refers to the concept that the two dies cooperate to deform a common thermoplastic material therebetween to meet the overall surface requirements of the material rather than to the specific detail present on each die face. That is, the two dies need not complement one another as they do for groove 24 and ridge 24', FIG. 1, for every groove, ridge and so forth appearing on a surface of the deformed material.

While a preferred embodiment of the present invention has been illustrated and described, it is intended that this embodiment is for purpose of illustration rather than limitation.

What is claimed is:

1. Apparatus for compressively deforming softened thermoplastic material having opposing edges comprising:
   a pair of spaced facing contoured dies adapted to receive said material therebetween;
   means for rotationally displacing at least one of said dies toward the other to progressively squeeze said material therebetween in a first direction generally from one edge of the sheet material to an opposing edge to deform the material into the contour of said dies;
   first means for securing said at least one die relative to the other die for rotation about an axis; and
   second means moveably securing said first means for relative displacement toward and away from the other of said at least one die in a direction transverse to the first direction.

2. The apparatus of claim 1 wherein said progressive squeezing imposes forces on said dies in a second direction generally opposite said first direction, said apparatus including support means for movably securing one of said dies so that said one die linearly displaces generally parallel to said second direction with the rotation of the at least one die.

3. The apparatus of claim 1 including first support means for supporting said at least one die for rotation about an axis, said first support means including means for urging said at least one die in a region adjacent said axis in a direction towards said other die.

4. The apparatus of claim 3 further including actuating means for urging said at least one die towards said other die at a location on said one die spaced from said region.

5. The apparatus of claim 4 wherein said apparatus includes means for locating said axis adjacent to one edge of the at least one die and for locating the actuating means adjacent to an opposing edge of said die.

6. The apparatus of claim 1 including means for fixedly securing said other die relative to the at least one die in an initial portion of a deforming cycle during the compressively deforming of said material and for movably securing said other die relative to the at least one die in a subsequent portion of said deforming cycle to permit said dies to align in response to forces on said dies in a direction induced by said squeezing.

7. Apparatus for compressively deforming heat softened thermoplastic sheet material in a deforming cycle comprising:

a first die having a first contoured surface;

a second die having a second contoured surfaced shaped and dimensioned to mate with the first surface; and means for forcing the first die toward the second die in a pivoting motion so that said dies progressively squeeze the sheet material therebetween in a direction generally from one edge of the material toward an opposing edge.

8. The apparatus of claim 7 including first actuating means for selectively urging one edge of the first die toward and away from the second die and second actuating means for selectively urging an edge of the first die opposite the one edge toward and away from the second die to pivot the first die about an axis during the squeezing.

9. The apparatus of claim 8 further including clamp means for clamping said sheet material to said second die in an initial portion of said deforming cycle.

10. The apparatus of claim 9 including means for fixedly securing the second die relative to the first die in said initial portion of a cycle and movably securing the second die in a portion of the cycle subsequent to said initial portion such that the deforming forces during said squeezing tend to movably align the second die to the first die.

* * * * *